(12) United States Patent
Sargeant et al.

(10) Patent No.: US 7,202,587 B2
(45) Date of Patent: Apr. 10, 2007

(54) METHOD AND APPARATUS FOR THE MOUNTING OF AND CIRCUMFERENTIAL DISPLACEMENT OF RADIAL FORCES IN A STATOR CORE ASSEMBLY

(75) Inventors: John Barry Sargeant, Oviedo, FL (US); Alex Christodoulou, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/031,791

(22) Filed: Jan. 7, 2005

(65) Prior Publication Data

US 2005/0236924 A1    Oct. 27, 2005

Related U.S. Application Data

(60) Provisional application No. 60/565,307, filed on Apr. 26, 2004.

(51) Int. Cl.
*H02K 1/12* (2006.01)

(52) U.S. Cl. ........................................ 310/258; 310/217

(58) Field of Classification Search ................ 310/254, 310/258, 259, 216, 217
See application file for complete search history.

(56) References Cited

U.S. PATENT DOCUMENTS

| | | | |
|---|---|---|---|
| 2,846,603 A * | 8/1958 | Webster et al. ............. 310/258 |
| 3,708,707 A * | 1/1973 | Kranz ......................... 310/258 |
| 4,278,905 A * | 7/1981 | Chari et al. .................. 310/52 |
| 4,564,779 A * | 1/1986 | Terry, Jr. ..................... 310/258 |
| 4,634,909 A * | 1/1987 | Brem .......................... 310/91 |
| 4,837,471 A * | 6/1989 | Kostoss et al. ............... 310/89 |
| 4,916,803 A | 4/1990 | Estrada ......................... 29/596 |
| 5,136,195 A | 8/1992 | Allen, III et al. ......... 310/68 D |
| 5,875,540 A | 3/1999 | Sargeant et al. ............. 29/596 |
| 6,104,116 A | 8/2000 | Fuller et al. ................ 310/217 |
| 6,337,530 B1 * | 1/2002 | Nakamura et al. ......... 310/258 |
| 6,346,760 B1 | 2/2002 | Boardman, IV ............ 310/259 |
| 6,448,686 B1 | 9/2002 | Dawson et al. ............. 310/254 |
| 6,548,928 B2 | 4/2003 | Walko et al. ................. 310/91 |
| 2002/0070629 A1 | 6/2002 | Dawson et al. ............. 310/258 |
| 2002/0070630 A1 * | 6/2002 | Dawson et al. ............. 310/258 |
| 2002/0070631 A1 | 6/2002 | Dawson et al. ............. 310/259 |

\* cited by examiner

*Primary Examiner*—Dang Le

(57) ABSTRACT

The present invention facilitates the placement of laminations 10 onto keybars 6 of stator generators frames 2. Laminations need to be tightly fit onto keybars 6, however, the same need for tightness makes stacking laminations onto keybars particularly onerous. This is magnified when donuts, which are preassembled groups of laminations, are attempted to be stacked onto the keybars 6. The present invention provides for enlarged grooves 12 that more easily accept the keybars. This makes stacking laminations, both individually and in donuts, much easier. The laminations are then held in position by the insertion of a wedge 16. The wedge may be placed to disperse forces 20 transferred to the laminations in a circumferential manner 22.

9 Claims, 4 Drawing Sheets

METHOD AND APPARATUS FOR THE MOUNTING OF AND CIRCUMFERENTIAL DISPLACEMENT OF RADIAL FORCES IN A STATOR CORE ASSEMBLY

CROSS-REFERENCE TO RELATED APPLICATIONS

This invention claims priority to U.S. Provisional application 60/565,307 filed on Apr. 26, 2004 entitled Methods and Apparatuses for Assembling Generator Stator Cores, which is incorporated herein by reference. This invention is further related to US applications: Apparatus and Method for the Installation of a Pre-Assembled Stator Core, by Allen, et al.; Horizontal Assembly of Stator Core using Keybar Extensions, by Sargeant et al.; Horizontal Assembly of Stator Core using a Central Rail Structure by Majernik et al.; all filed herewith and all incorporated herein by reference.

FIELD OF THE INVENTION

The present invention relates to power generators and more specifically, the assembly of the generator stator core.

BACKGROUND

The generator stator core is the largest monobloc component in the train of a turbine generator set. The stator cores are manufactured from thousands of thin steel laminations of which are stacked, pressed and clamped together into the large cylindrical form of the stator core. The clamping is necessary for several reasons but principally to ensure that geometric form is maintained under the forces imposed during unit operation. Improper clamping can result in lamination vibration during generator operation, due to magnetic impulses and/or core elliptical dilation.

Typically, the stator core is assembled at the final installation site. However, the large size of the stator core and the need for proper clamping results in several stator core manufacturing complexities, including the need for generous floor space, high crane requirements, lead time and other associated manufacturing difficulties. For example, if the core is stacked directly in the stator frame, the frame must be delivered to the site before any manufacturing steps can occur. Additionally, intermediate core pressing equipment is needed to press and clamp the laminations together at incremental lengths. If, on the other hand, the stator core is manufactured in an external fixture, the external fixture itself adds to the manufacturing costs and requires additional floor space on site and still requires the use of heavy cranes.

U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of time over assembling the laminations individually, and produced a stator core with less flaws.

When the individual laminations, or the set of laminations in a donut, are installed into a core, they engage what are referred to as keybars. Keybars are essentially rods that run the internal length of the stator core and provide a hook-in spot for the laminations. FIG. 1 illustrates a stator frame that is empty of any laminations. The keybars 6 run the internal length of the stator frame 2, and are generally attached to the frame through stator support rings 4.

The laminations have complimentary grooves that hook onto the keybars, as shown in FIG. 2. In this figure, a typical styles of keybars and grooves are shown. FIG. 2 illustrates the dovetail design, where the lamination 10 has a groove 12 that matches the keybar 6. By sliding the lamination 10 onto the keybars 6, the laminations are held in place within the stator frame. Since the stator core will vibrate during operation, it is important that the keybars and any attachment to the keybars, are held tightly against the core.

Since the laminations may be mounted individually or in aggregates such as donuts, if the fit between the lamination grooves 12 and the keybars 6 is too tight, installation can be very difficult or, in the extreme, precluded. Thus, there is a need for laminations or donuts that are easily placed onto keybars, but are still able to be tightly fitted.

SUMMARY OF THE INVENTION

With the foregoing in mind, methods and apparatuses consistent with the present invention facilitate the placement of laminations or donuts onto the keybars of the stator frame. Laminations need to be tightly fit onto keybars, however, the same need for tightness makes stacking laminations onto keybars particularly onerous. If the clearance between the hook in the lamination and the keybar is small, assembly becomes impeded. This is exacerbated when donuts, which are preassembled groups of laminations, are attempted to be stacked onto the keybars. The present invention provides for enlarged grooves that more easily accept the keybars. This makes stacking laminations, both individually and in donuts, less restrictive. The laminations or donuts are then held in position by the insertion of a wedge or wedges. The wedge may be inserted by a variety of techniques, and multiple wedges may be used in each groove.

With wedges being placed towards the outer edges of the lamination or donut, the forces transferred to the lamination or donut from the keybar are distributed in a more circumferential, rather than exclusively radial, direction. This creates a more solid fit between the laminations and the keybars, since the laminations are subject to circumferential forces during the operation of the stator generator.

These and other objects, features, and advantages in accordance with the present invention are provided in one embodiment by a method of securing laminations or donuts to a generator assembly by attaching multiple keybars to a generator assembly frame such that the keybars run axially along an inner diameter of the generator assembly frame and where the keybars are substantially evenly spaced. A multiple of laminations are provided that have a multiple of grooves corresponding to the keybars, where at least a portion of the grooves are substantially larger than the corresponding keybars. The laminations or donuts are then aligned with the keybars and inserted into the generator assembly along the keybars. The laminations or donuts are wedged by driving at least one wedge into the grooves.

In another embodiment the present invention provides for a generator assembly, which comprises a generator assembly frame and multiple stacked laminations which form a stator core. Multiple keybars secure the stator core to the generator assembly. The laminations that make up the stator core have grooves in them that align with the keybars and which hold the laminations to the keybars. When the laminations are in place, the grooves have a larger cross section than the keybars, thereby forming gaps between the keybars and the laminations. In these gaps are multiple wedges, which ultimately allow for the secure fit of the stator core to the keybars.

BRIEF DESCRIPTION OF THE FIGURES

The invention is explained in more detail by way of example with reference to the following drawings.

DETAILED DESCRIPTION OF THE INVENTION

The present invention comprises a method of mounting laminations, either individually or in aggregate, onto stator frame keybars. Laminations have grooves along their outer length to accommodate the keybars. In the prior art the grooves have had to be to be closely fit on the keybars, which has permitted subsequent tightening of the guard rings around the stator core, since a loose fit between the keybars and laminations will cause damage to the stator core as well as produce excess noise and vibration. However, the very same tight-fit that is needed when the stator core is operating creates problems when mounting laminations onto the keybars and essentially precludes the assembly of large preassembled donuts, since lamination aggregates such as donuts have to fit onto multiple keybars simultaneously.

A trend in stacking the laminations has been to first compile the laminations into donuts before mounting them onto the keybars. This, however, further complicates the task of fitting the laminations to the keybars. The present invention solves this problem by expanding the grooves, so that laminations or donuts may be placed onto the keybars with ease. Wedges, which may be specifically designed, are then driven down the grooves, providing a tight fit between the laminations and the keybars.

As used herein the term laminations and donuts are used interchangeably to describe aggregates of laminations in partially assembled form, whether the aggregates are rod-shaped, donut shaped, ring shaped or partial assemblies of the shapes thereof. Though the present invention increases in utility with the increase of the size of the pre-stacked laminations, the invention is equally applicable to smaller sets of laminations and even assembly of individual laminations within the stator frame.

In some instances the grooves may be expanded in a shape that is similar to the keybar. In other cases the grooves may be expanded in a cross-sectional shape that is different from the keybar. In such circumstances, the wedges are then specifically designed to provide a tight fit in the gap created between the laminations and keybars. Note that although this invention discusses expanding the grooves in the lamination, it is more common that the laminations will simply be created with the larger sized groove, rather than existing laminations being retro-fitted with the specifications of the present invention.

Figure 1:
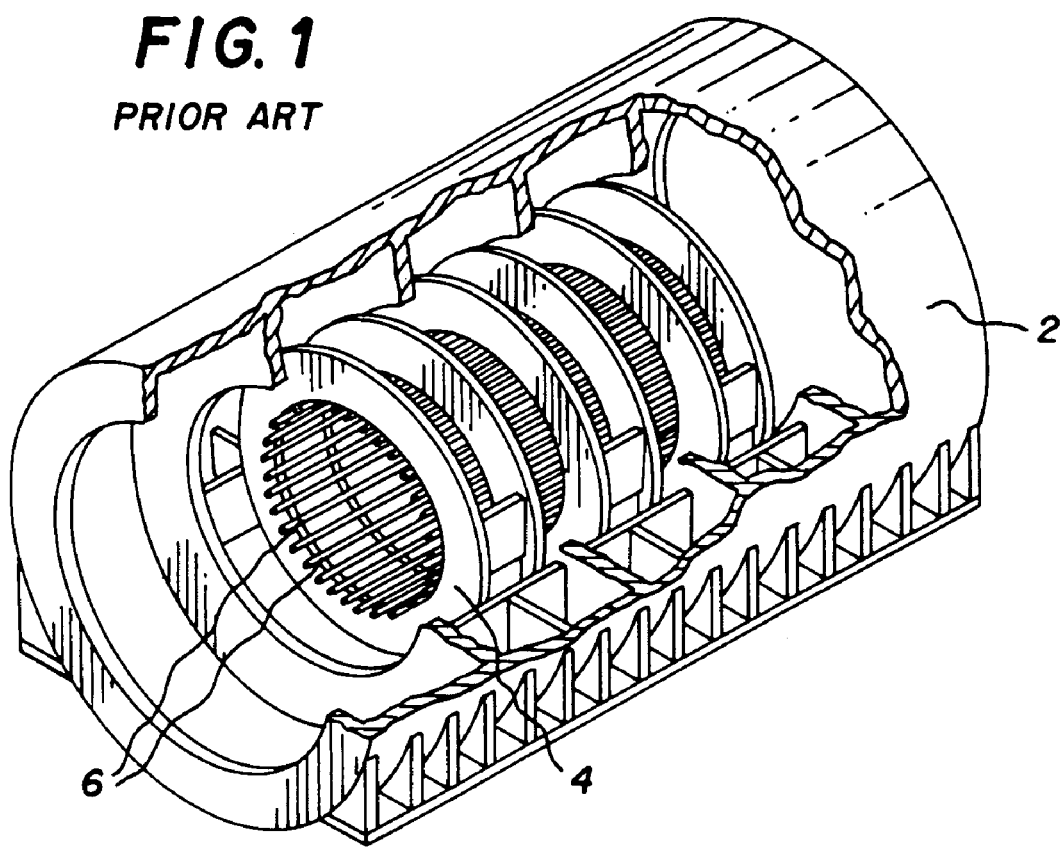
FIG. 1 illustrates a cut-away view of a stator frame, including stator support rings and keybars.
Figure 2:
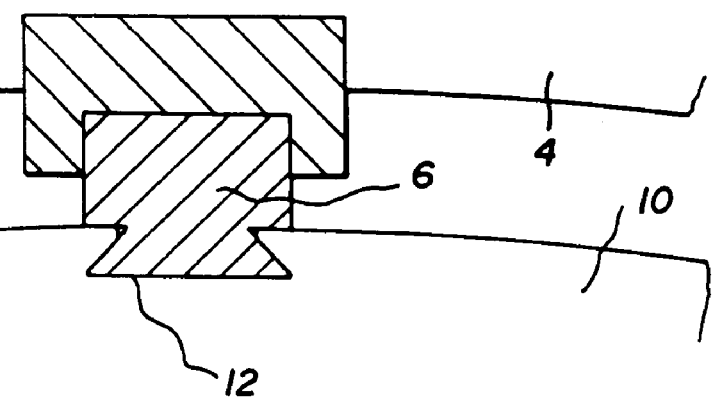
FIG. 2 illustrates a dove-tail style keybar and lamination arrangement of the prior art.
Figure 3:
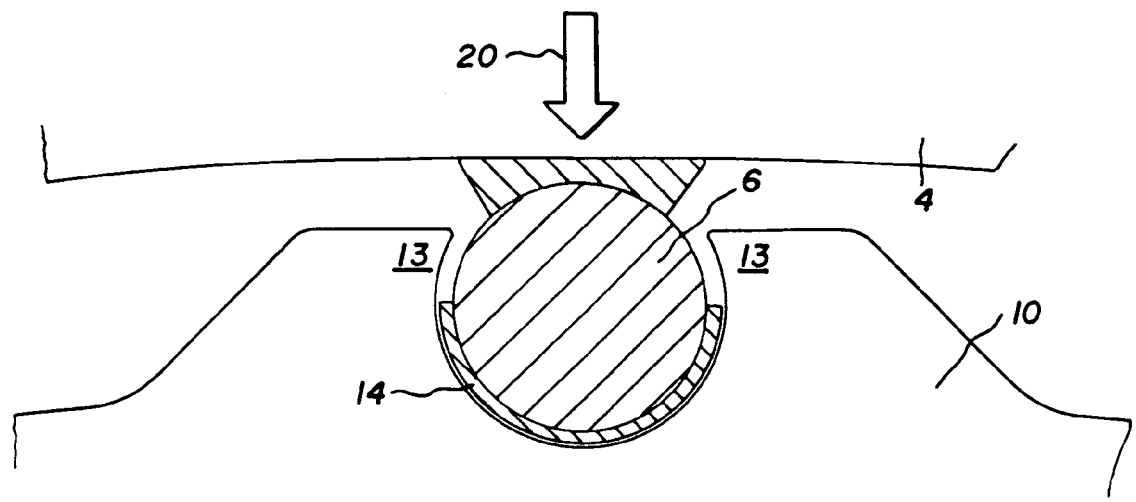
FIG. 3 illustrates a building-bolt style keybar and lamination arrangement according to one embodiment of the present invention.

The gap between the keybar and the groove in the lamination can be wedged by a variety of techniques. FIG. 3 shows an example where an arc shaped wedge 14, similar to the shape of the keybar 6, fills the gap between the lamination 10 and the keybar 6. This wedge holds the lamination secure to the keybar, however, to endure the vibratory forces of an operating generator, it will be necessary to subsequently tighten this connection. In FIG. 3, the wedge may be more accurately described as a partial ferrule. It is understood by one of ordinary skill in the art that the term wedge, as used herein includes ferrules, crams, slivers, segments and other related items. Further, multiple wedges may be used where only one wedge is described.

One technique for securing the laminations tighter to the keybars is to have an adjustable support ring 4. By adjusting the support rings, specifically by reducing the diameter of the support ring 4, force may be applied radially 20 to the keybars, which essentially forces the keybars 6 against the laminations 10, thereby holding them securely together. This added pressure from the support rings 4 can greatly reduce free vibration of the stator core generator and consequently reduce the noise generated by these components.

When the support rings 4 are tightened, the radial force 20 will secure the keybar to the lamination along that radial line. However, when a stator core is in operation, much of the forces between the keybar and the laminations will occur circumferentially. Therefore, while the force 20 securely holds the stator core to the support ring, it is not an effective means of transmitting circumferential forces due to machine torque since much of that force is not adequately holding the laminations in place when they are being subject to extreme circumferential stress.

In one embodiment of the present invention, the radial forces 20 applied to the laminations or donuts (mainly from the support rings) are distributed in a more circumferential direction. This is accomplished by positioning at least two wedges more towards the circumferential edge 13 of the laminations, and placing little or no wedge support towards the bottom of the grooves.

Figure 4:
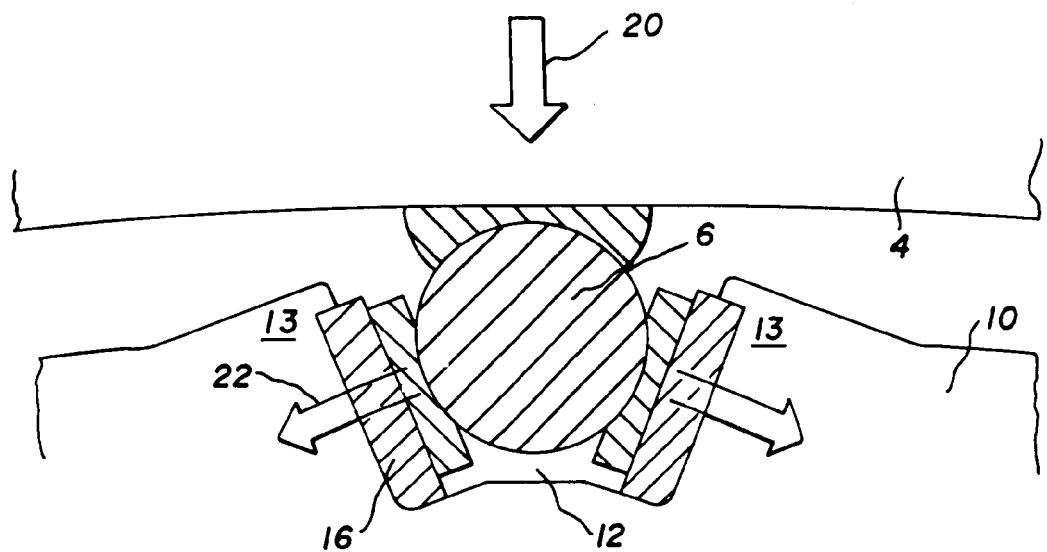
FIG. 4 illustrates another building-bolt style keybar and lamination arrangement according to one embodiment of the present invention.

FIG. 4 illustrates one embodiment of the invention where wedges are placed so that the radially applied force 20 from the support ring 4 will be dispersed to the lamination 10 in a more circumferential manner 22. By doing this, the laminations are more securely held to the keybars during operation and creates a more effective means for transmitting machine torque. Unlike the prior art, the groove 12 in the lamination does not have to match the shape of the keybar 6.

The shape of the grooves 12 additionally may be varied between laminations or donuts in the same stacking. Some laminations in a set may not provide any support against the keybar at all, so that only some of the laminations in an aggregate are securely wedged against they keybars. Similarly, different sets of laminations may be supported by different wedges. The wedges 16 may be inserted by a variety of techniques known in the art. Generally, the laminations may be shifted or positioned by means of an external support while the wedges are being inserted. Some wedges may be a single piece unit, while others may be made up of two or more pieces.

Figure 5:
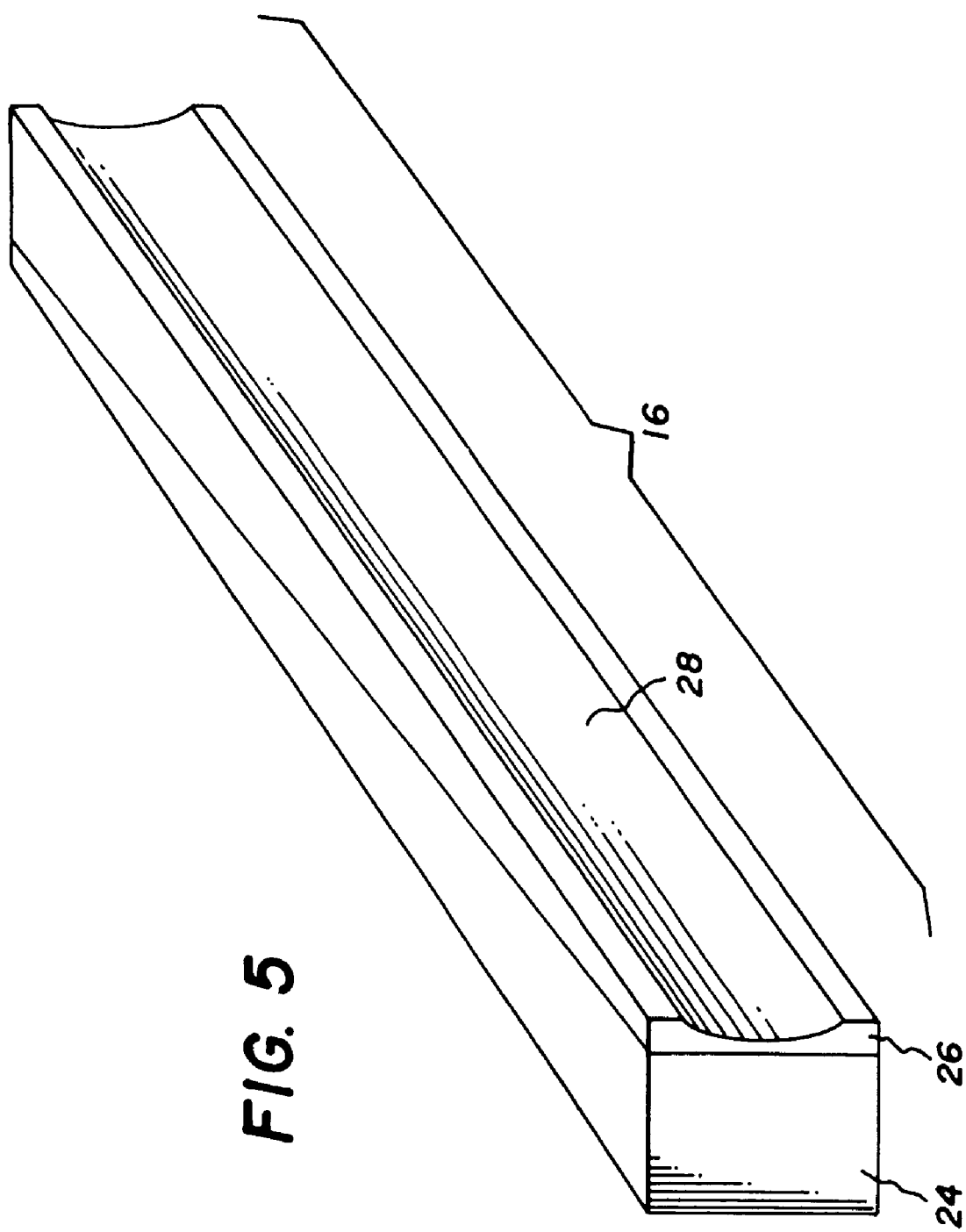
FIG. 5 illustrates one example of a type of wedge that may be used with the present invention.

FIG. 5 illustrates one example of a two-piece wedge that may be used in the embodiment shown in FIG. 4. The two pieces of this wedge have tapers that compliment one another. The back part of the wedge 24 that is flush with the laminations, may be placed prior to inserting the lamination or donut onto the keybars. The second part of the wedge 26, which includes a fitted surface complimentary to the keybar 28, is then inserted once the lamination(s) is aligned with the keybars.

Figure 6:
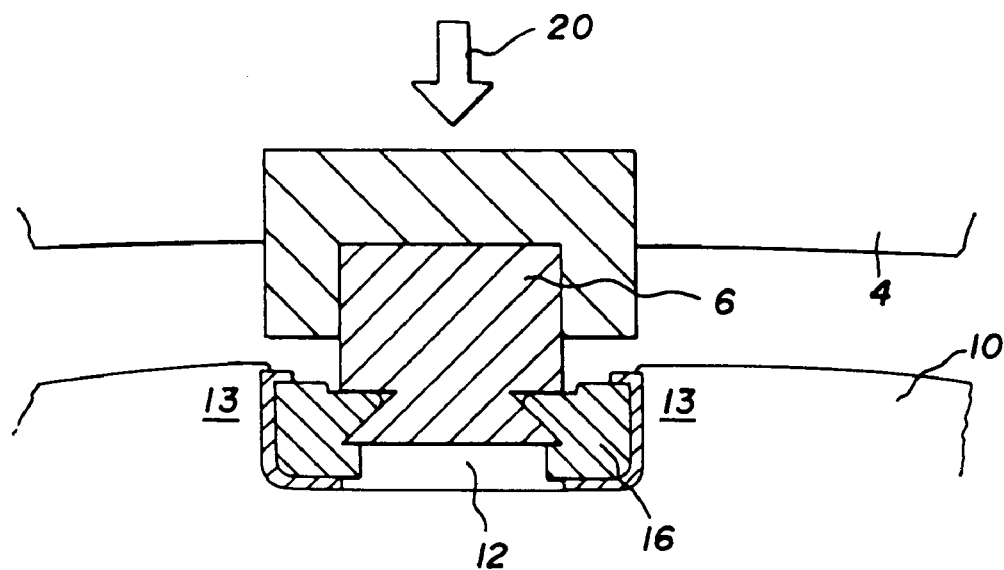
FIG. 6 illustrates a dove-tail style keybar and lamination arrangement according to one embodiment of the present invention.

FIG. 6 shows an embodiment of the present invention in use with a dove-tail style keybar. The wedges 16 may be similar to the type shown in FIG. 5, or they may be a single piece or of another type known in the art. Similar to FIG. 4, the radial pressure 20 from the support rings 4 is directed in a more radial direction 22 through the placement of the wedges 16 more towards the circumferential edge 13 of the grooves 12.

Figure 7:
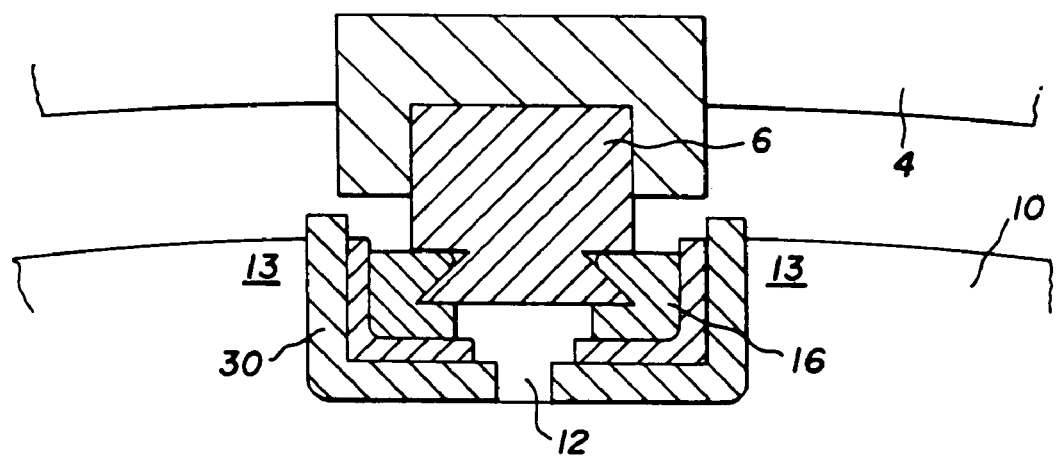
FIG. 7 illustrates another dove-tail style keybar and lamination arrangement, where the keybar is electrically insulated from the keybar, according to one embodiment of the present invention.

In some instances, it is desirable to have the laminations insulated from the keybar. When this is the case, additional insulation may be added with the wedge, as is shown in FIG. 7. In this figure additional insulation 30, such as a mica sheet and glass or other insulating material, is placed between the wedge 16 and the lamination 10. In the case of a two-piece tapered wedge discussed in FIG. 5, it would be desirable to have the insulation and first piece of the wedge 24 in place prior to mounting the lamination 10 on the keybar 6, so as to avoid tearing forces on the insulation 30 when the wedge 16 is inserted.

The wedges may be made out of a variety of materials, such as steel or composite materials. In some instances it would be desirable to have the wedges conductive, and they could therefore be made from conductive materials such as copper or aluminum. The wedges can be insert by a variety of techniques that would be apparent to one of ordinary skill in the art, such as manually or with hydraulic devices.

It is also important to note that the gaps do not have to be uniformly or consistently wedged. For example, a single groove and keybar segment may have an inconsistent wedging, or a plurality of different wedgings along its length. Also, since a typical stator frames comprises twenty or more keybars, not every keybar needs to be secured by wedges to the laminations. Indeed, the grooves in the laminations may have different styles of cross sections, requiring different types of wedges. Some grooves may fit the keybars tighter than others.

In one embodiment the present invention provides a generator assembly, which comprises a generator assembly frame and a multiple of stacked laminations which form a stator core. Multiple keybars secure the stator core to the generator assembly. The laminations that make up the stator core have grooves in them that align with the keybars and which hold the laminations to the keybars. When the laminations are in place, the grooves have a larger cross section than the keybars, thereby forming gaps between the keybars and the laminations. In these gaps are multiple wedges, which ultimately allow for the secure fit of the stator core to the keybars.

Not every lamination groove needs to have the same cross-sectional shape or size. However, in one embodiment the grooves in all of the laminations are substantially uniform in cross-section. Similarly, not every groove needs to have wedges placed therein. However, in one embodiment all of the grooves in the lamination stack have wedges therein. In embodiments where the grooves are not uniform in cross-section, the variety in cross-sectional shape may be used to indicated information, such as proper positioning and orientation.

The wedges may be of a variety of types, and in one embodiment the wedge is a two-piece unit. If two wedges are used, and placed towards the circumferential edge of the grooves, radial forces from the keybars will be dispersed to the laminations in a generally circumferential direction.

In another embodiment, the present invention provides for a stator generator assembly comprising a generator assembly frame and a multiple of stacked laminations. The stacked laminations may either be laminations that were assembled individually, or originally donuts that have been stacked to form a stator core. There are multiple keybars securing the stator core to the generator assembly frame. The stacked laminations have multiple grooves that match sections of the keybars, and the grooves are fitted with the keybars to secure the stator core to the stator frame. However, the grooves are larger than the matching sections of the keybars, forming a series of gaps between the keybars and the stacked laminations. To secure the stator core, multiple wedges are inserted in the series of gaps.

In a particular embodiment of the present invention the wedges are aligned such that forces from the keybars are dispersed in a generally circumferential direction into the laminations. In a further particular embodiment, the keybars are of a building-bolt type, and in another embodiment they are of a dove-tail type.

In another embodiment the present invention provides for a method of securing laminations to a generator assembly by attaching a multiple of keybars to a generator assembly frame such that the keybars run axially along an inner diameter of the generator assembly frame and where the keybars are substantially evenly spaced. A multiple of laminations are provided that have a multiple of grooves corresponding to the keybars, where at least a portion of the grooves are substantially larger than the corresponding keybars. The laminations are then aligned with the keybars and inserted into the generator assembly along the keybars. The laminations are wedged by driving at least one wedge into the grooves.

In one embodiment the wedges are two-piece. The first piece of the two piece wedge is placed in the laminations prior to the laminations being inserted into the generator assembly, and a second piece of the two piece wedge is wedged after the laminations are inserted into the generator assembly.

In another embodiment the wedging comprises driving two wedges into the grooves. The two wedges may be spaced substantially towards a circumferential direction of the laminations, thereby the radial forces applied to the keybars are transferred to the laminations at least partially in the circumferential direction.

In some instances it is preferable to have the laminations grounded from the keybars. Therefore, in a particular embodiment the laminations are electrically grounded from the keybars.

In one embodiment the laminations are inserted horizontally into the generator assembly. This is still referred to as stacking, even though it is done in a horizontal, rather than vertical manner. Since horizontal stacking frees up one end of the stator frame, both ends of the generator assembly may be stacked more or less at the same time.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A generator assembly comprising:
   a generator assembly frame;
   a plurality of stacked laminations forming a stator core;
   a plurality of keybars securing said stator core to said generator assembly frame;
   wherein said stacked laminations have a plurality of grooves that match sections of said keybars, and wherein said grooves are fitted with said keybars;
   wherein said grooves are larger than the matching sections of said keybars, forming a plurality of gaps between a plurality of said keybars and said plurality of grooves; and
   a plurality of wedges;
   wherein said plurality of wedges are inserted in said plurality of gaps, securing said stator core to said keybars;
   wherein said wedges are aligned such that the majority of forces from said keybars are dispersed in a generally circumferential direction into said laminations.

2. The generator assembly of claim 1, wherein two wedges are inserted into each of said grooves.

3. The generator assembly of claim 1, wherein said wedges comprise a two-piece wedge unit.

4. The generator assembly of claim 1, wherein said stacked laminations are electrically insulated from said keybars.

5. The generator assembly of claim 1, wherein all of said grooves in said laminations are of a uniform cross-section.

6. The generator assembly of claim 1, wherein all of said grooves in said laminations engage a keybar and wherein all of said resulting gaps have wedges inserted therein.

7. A stator generator assembly comprising:
   a generator assembly frame;
   a plurality of stacked laminations forming a stator core;
   a plurality of keybars securing said stator core to said generator assembly frame;
   wherein said stacked laminations have a plurality of grooves that match sections of said keybars, and wherein said grooves are fitted with said keybars;
   wherein said grooves are larger than the matching sections of said keybars, forming a series of gaps between said keybars and said stacked laminations; and
   a plurality of wedges;
   wherein said plurality of wedges are inserted in said series of gaps, securing said stator core to said keybars;
   wherein said wedges are aligned such That the majority of forces from said keybars are dispersed in a generally circumferential direction into said laminations.

8. The stator generator assembly of claim 7, wherein said keybars are of a building-bolt type.

9. The stator generator assembly of claim 7, wherein said plurality of wedges conform to the shape of said grooves on one side, and the shape of said keybars on the other side.

* * * * *